Aug. 13, 1968  W. E. ALTMANN  3,396,599
STEERING COLUMN FOR VEHICLES
Filed Nov. 18, 1965  3 Sheets-Sheet 1
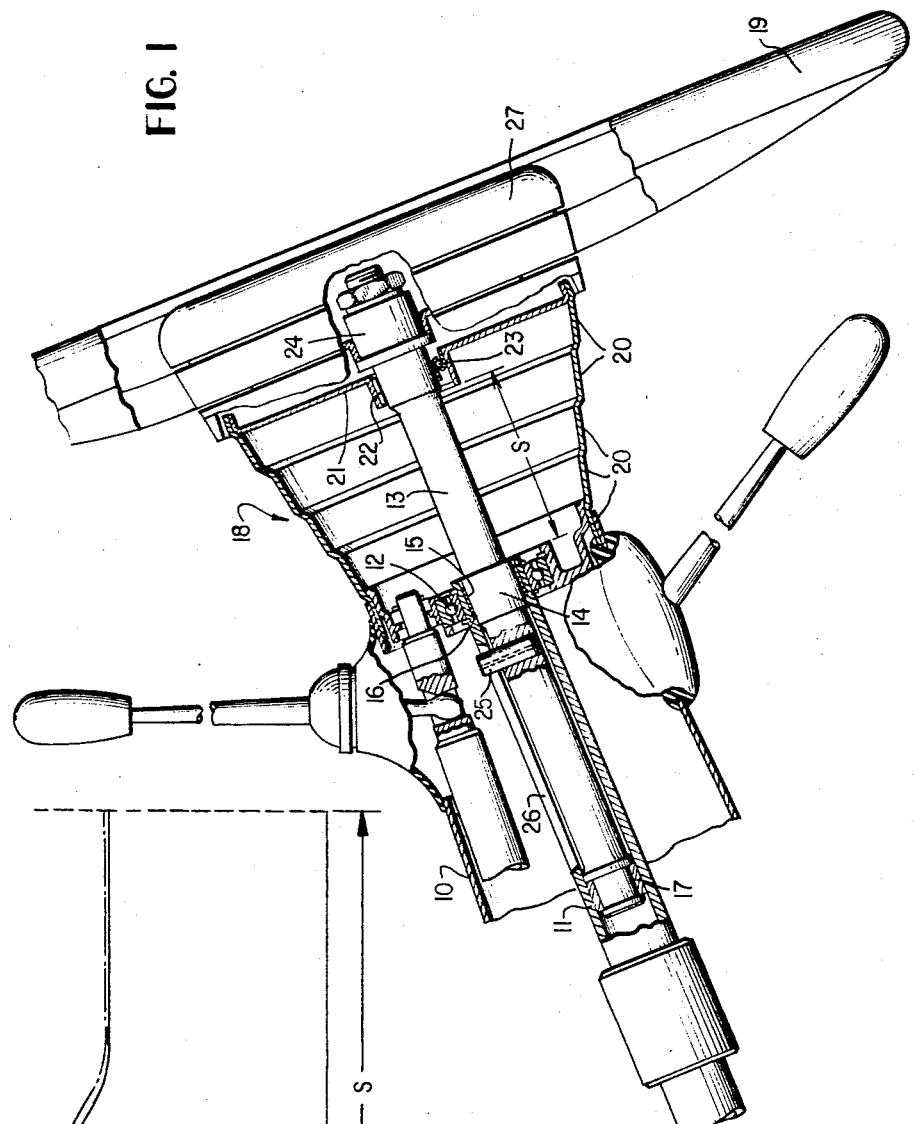
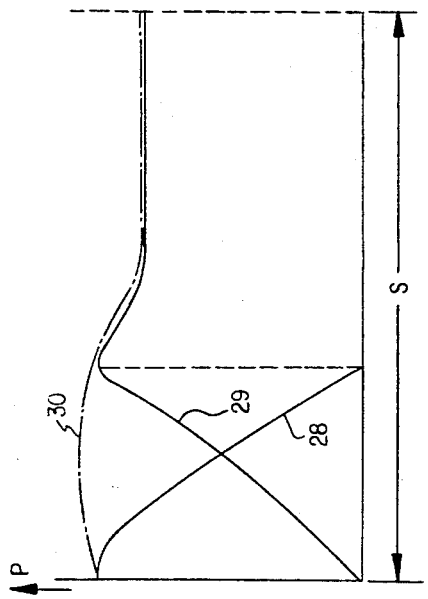
INVENTOR
WERNER ALTMANN
BY *Dicke & Craig*
ATTORNEYS

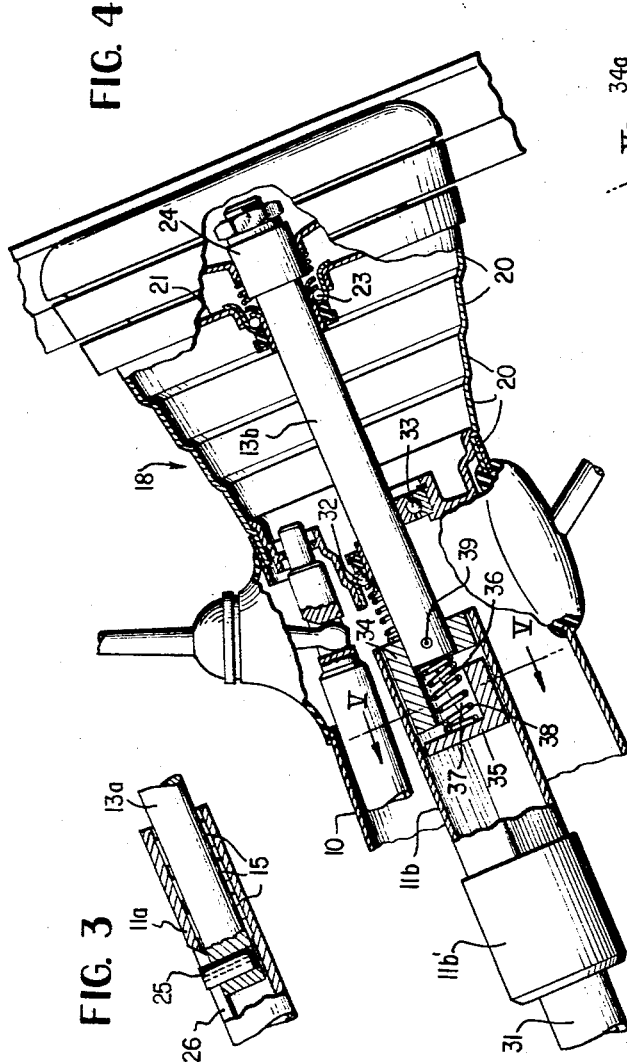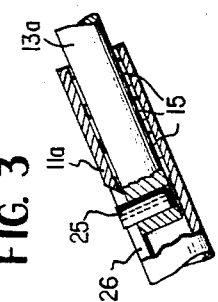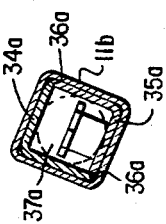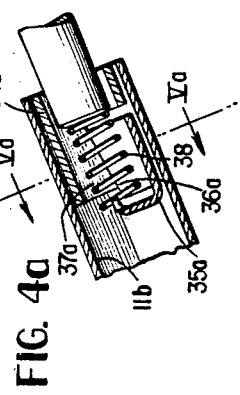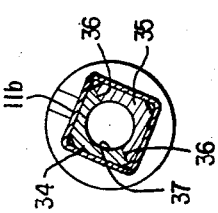

Aug. 13, 1968  W. E. ALTMANN  3,396,599
STEERING COLUMN FOR VEHICLES
Filed Nov. 18, 1965  3 Sheets-Sheet 3
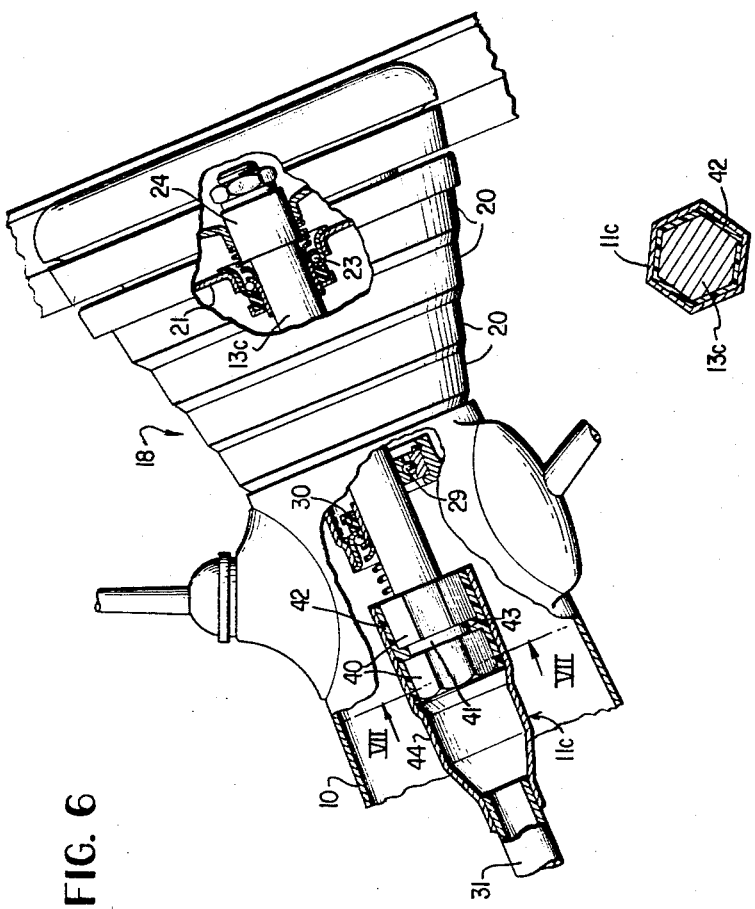
INVENTOR
WERNER ALTMANN
BY *Dicke & Craig*
ATTORNEYS

United States Patent Office 3,396,599
Patented Aug. 13, 1968

3,396,599
STEERING COLUMN FOR VEHICLES
Werner E. Altmann, Stuttgart, Germany, assignor to Daimler-Benz Aktiengesellschaft, Stuttgart-Unterturkheim, Germany
Filed Nov. 18, 1965, Ser. No. 508,468
Claims priority, application Germany, Nov. 26, 1964, D 45,920
21 Claims. (Cl. 74—492)

ABSTRACT OF THE DISCLOSURE

A safety steering column for vehicles, especially motor vehicles, whereby the steering spindle extending in a tubular casing is subdivided into at least two parts that are mutually displaceable in a telescopic manner but are rotatable in unison without play within a predetermined torque range and of which a first part is supported in the casing so as to be rotatable but axially immovable. The two parts are provided with a friction force fit transmitting the steering torque without play and providing resistance during relative axial movement. An interference fit is provided to form the torque driving connection only for steering torques above the permissible torque range. The friction interference fit is such that a constant axial friction will be produced or a variable friction force will be produced that is combined with a collapsible pot axial resistance force to produce a combined uniform force over full axial relative movement.

Background of the invention

It is known to construct the steering spindle in two parts and to displaceably support the upper part of the steering spindle in the tubular casing in such a manner that the two parts thereof may be telescopically moved one within the other in order to reduce during impact accidents the impact continuing by way of the steering column along a sufficiently large deformation path whereby both parts are provided with splined profiles or complementary keyed cross sections for the transmission of the steering torque. The telescoping parts are thereby mutually supported by elastic means such as rubber cushions, rubber buffers, compression coil springs and the like and/or are provided with hydraulic brake mechanisms.

It is further known in the prior art to utilize an air cushion—adjustable as regards the pressure—which is pierced in case of catastrophic accidents and thereupon yields. Finally, a solution is known according to which the lower part of the steering spindle is provided with abutments which are intended to be sheared off in a steplike manner in case of an impact.

All of the aforementioned known installations, however, entail disadvantages. On the one hand, considerable costs arise already initially, for example, with the use and application of hydraulic and pneumatic brake mechanisms. On the other hand, the costs are further considerably increased in case of an impact since the parts in question that are expensive to manufacture are thereby completely damaged and have to be exchanged. The inherently expensive and costly manufacture of splined cross sections or keyed profiles for the transmission of the steering torque is additionally never so accurate that a play in the circumferential direction is completely avoided. It has been attempted to fill these intermediate spaces or interstices with soft rubber which, however, is insufficient because firstly the soft rubber yields and secondly because the soft rubber does not withstand over longer periods of time the alternate stressing occurring during the steering of a vehicle.

The also known spring elements acting in the axial direction entail the disadvantage that they do not dampen the incoming impact but merely store the same and subsequently transmit the same in full strength into the passenger space.

Summary

Accordingly, the present invention is concerned with the task to avoid the aforementioned disadvantages and therebeyond to achieve the advantage that an effective damping of impacts is achieved with simple and inexpensive means whereby in the case of an impact only easily exchangeable and inexpensive parts are to be damaged. Additionally, the present invention is concerned with the further task to avoid a play in the direction of rotation between the telescoping parts.

The basic concept of the present invention resides in the fact that for purposes of the uniform dissipation of an axial impact on the steering spindle, a conventional deformation pot is arranged between the first steering spindle part or the part carrying the same and a second displaceable steering spindle part carrying the steering wheel and/or that the means provided between the first and second steering spindle part for the play-free transmission of the steering torque serve simultaneously for the production of a mechanical frictional resistance in case of axial displacement.

It is known to arrange the deformation pot as intermediate member between the steering wheel and the steering spindle whereby the deformation pot is axially displaceable together with the steering spindle and also serves as transmission element for the steering torque from steering wheel to the steering spindle, for example as shown in the United States patent to Fredericks et al., 3,016,764, issued Jan. 16, 1962. In contradistinction thereto, the present invention proposes that this deformation pot be secured, on the one hand, at the tubular casing of the steering column and be connected, on the other, below the steering wheel with a disk-like part which receives within a bearing the second steering spindle part connected with the steering wheel. The advantage of the arrangement of the deformation pot according to the present invention resides in that the latter now has to absorb essentially only longitudinal forces and not additionally also torsional and large bending moments.

The construction and arrangement of the conical deformation pot takes place according to a preferred embodiment of the present invention in such a manner that the pot faces with its larger diameter the steering wheel and consists of several step-like conical sections, one passing over into the other, whereby both the tubular casing as well as the disk-like part are supported on the last step-like section of the deformation pot. However, it is also feasible within the scope of the present invention to coordinate the deformation pot with its smaller diameter to the steering wheel.

In addition to the deformation pot or in lieu thereof, the present invention also proposes such a construction of the means provided between the first and second steering spindle part that these means establish a force-locking connection between these two parts both in the direction of rotation as well as in the longitudinal direction.

At least one tolerance or fitting ring is provided as force-locking connecting means according to one embodiment of the present invention which is axially fixed in a recess or enlargement of the one steering spindle part and abuts force-lockingly at the other steering spindle part.

This construction preferably also provides that the second axially movable steering spindle part is provided within the first tubularly shaped steering spindle part with a collar, against which abuts the tolerance or fitting ring that is axially secured in the recess of the tubularly shaped steering spindle part. However, in principle, it is also possible to construct the second diplaceable steering spindle part tubularly shaped and the first steering spindle part rod-shaped and provided with a collar. The arrangement of the tolerance or fitting ring has the advantage that only a small portion of the rod-shaped steering spindle part, namely, the aforementioned collar, has to be provided with an accurate fit. This construction envisages the arrangement of a deformation pot. However, it is also possible to construct the rod-shaped steering spindle part without collar whereby the tolerance or fitting ring abuts directly at the shank of the rod-shaped steering spindle part and produces upon displacement of the latter a resistance constant along the displacement path. With this construction, the deformation pot may be dispensed with. Instead, the present invention proposes to arrange in lieu of the latter, a tubular portion displaceable without resistance with respect to the tubular casing which only has to absorb slight transverse forces.

Since the tolerance or fitting ring only transmits the steering torque from one to the other spindle part up to a certain amount predetermined in advance as the permissive amount, an entrainment pin is secured at the second steering spindle part for the transmission of a steering torque which is greater than the limit torque transmissible by the tolerance or fitting ring; the entrainment pin thereby engages in a longitudinal slot provided in the first steering spindle part. The effective operation of the entrainment pin, however, is to take place only after the corresponding steering spindle part has rotated already by a predetermined amount with respect to the tolerance or fitting ring so that the driver's attention is directed to the overload of the steering system.

Furthermore, the present invention proposes as an additional basic concept that means are provided between the first and second steering spindle part which establish between these two parts a form-locking connection in the direction of rotation and a force-locking connection in the longitudinal direction.

A preferred embodiment thereby proposes that two coupling members having a right-angle cross section and forming—assembled—a square are provided as connecting means at the second steering spindle part within the first steering spindle part also of square shape whereby the two mutual contact surfaces of the coupling members are constructed as inclined surfaces and whereby one coupling member is rigidly secured at the second steering spindle part while the second coupling member is supported against the first coupling member by means of a coil-shaped compression spring which is arranged in an aperture formed by the two coupling members. The coupling members may be made of drawn material subsequently machined correspondingly as also of punched-out sheet metal which means a fast and inexpensive manufacture. It is not absolutely necessary according to the present invention to construct the coupling members and the associated first steering spindle part of square or quadrangular shape, instead, any desired profile or cross section may be provided which differs from a circular shape.

A second embodiment which distinguishes itself by particular simplicity and inexpensiveness in the manufacture thereof provides that a layer of synthetic plastic material is provided as connecting means between the polygonal collar of the second steering spindle part and a similarly shaped polygonal enlarged or expanded part of the first steering spindle part, which layer of synthetic plastic material is axially fixed by the collar resulting from the expanding of the first steering spindle part. Preferably, the collar of the second steering spindle part and the expanded portion of the first steering spindle part are of hexagonal shape whereby the collar may be provided with an annular groove that is filled with the synthetic plastic material during installation thereof and forms a plastic bulge or bead which has to be sheared off at first before a mutual displacement of the two steering spindle parts is possible. The bulge or bead and the annular groove are so dimensioned that the bulge is sheared off upon exceeding an impact magnitude predetermined as still permissive and thus releases the spindle parts for axial displacement against the frictional resistance of the remaining plastic layer. The installation of the plastic layer can take place in liquid condition, for example, by molding or injecting.

Accordingly, it is an object of the present invention to provide a safety steering column and spindle assembly which avoids, by extremely simple and inexpensive means, the shortcomings and drawbacks encountered with the prior art constructions.

Another object of the present invention resides in the provision of a safety steering column which effectively absorbs impact energy yet does not involve the destruction of expensive parts.

A further object of the present invention resides in a safety steering column that obviates the need for expensive braking mechanisms to protect the driver against injuries in case of collisions or other accidents.

Still another object of the present invention resides in a safety steering column which not only improves the safety of the driver by simple means but also eliminates all play in the direction of rotation of the steering system.

A further object of the present invention resides in a safety steering system that gives notice to the driver when a predetermined steering torque has been exceeded that might lead to damages in the steering system.

Description of the drawing

These and further objects, features, and advantages of the present invention will become more obvious from the following description when taken in connection with the accompanying drawing, which shows, for purposes of illustration only, several embodiments in accordance with the present invention, and wherein:

FIGURE 1 is a longitudinal cross-sectional view through a first embodiment of a steering column in accordance with the present invention;

FIGURE 2 is a qualitative diagram for the construction of FIGURE 1 indicating the curve for the resistance force P plotted against the deformation path S;

FIGURE 3 is a partial longitudinal cross-sectional view through a modified construction of a steering column similar to that of FIGURE 1;

FIGURE 4 is a longitudinal cross-sectional view through a still further modified embodiment of a steering column in accordance with the present invention;

FIGURE 4a is a partial longitudinal cross-sectional view through a modified construction of the steering column of FIGURE 4;

FIGURE 5 is a transverse cross-sectional view taken along line V—V of FIGURE 4;

FIGURE 5a is a transverse cross-sectional view taken along line Va—Va of FIGURE 4a;

FIGURE 6 is a longitudinal cross-sectional view through a still further modified embodiment of a steering column in accordance with the present invention; and FIGURE 7 is a transverse cross-sectional view taken along line VII—VII of FIGURE 6.

Referring now to the drawing wherein like reference numerals are used throughout the various views to designate like parts, reference numeral 10 designates in the embodiment illustrated in FIGURE 1 the tubular casing of conventional construction. The tubularly shaped first steering spindle part 11 is rotatably supported within the casing 10 by means of the ball bearing 12 but is axially fixed therein. The lower end of the axially movable rod-shaped second steering spindle part 13 is located within the first steering spindle part 11. The second steering spindle part 13 is provided with a collar 14. A tolerance or fitting ring 15 is axially fixed in a recess 16 of the first steering spindle part 11 and abuts force-lockingly against the collar 14 of the second stereing spindle part 13. Additionally, the second steering spindle part 13 is supported against the inner wall of the first steering spindle part 11 by means of a fitted bushing 17 in order to avoid a canting. A substantially conical deformation pot 18 adjoins the casing 10 as the upper extension thereof. The deformation pot 18 faces with its larger diameter the steering wheel 19 and consists of several step-shaped conical sections 20 adjoining one another whereby both the casing 10 as well as a disk-like part 21 connected with the steering wheel 19 is supported on the last step. The free end of the second steering spindle part 13 is supported by means of a needle bearing 22 or a ball bearing 23 in the disk-like part 21 connected, on the one hand, with the steering wheel 19 and on the other, with the deformation pot 18 whereby the deformation pot 18 suited for the absorption of transverse forces prevents an eventual vibration or bending of the free end of the second steering spindle part 13.

The steering torque is transmitted from the steering wheel 19 by way of a bushing 24 to the second steering spindle part 13, by way of a rigid connection between parts 19, 24 and 13. The steering spindle part 13 passes on the steering torque up to a predetermined amount established beforehand as permissive, by way of the tolerance or fitting ring 15 to the first steering spindle part—without play in the direction of rotation. The steering torque then passes on from the first steering spindle part 11 to a third steering spindle part (not illustrated in FIGURE 1) which is rigidly secured to the lower end of the first steering spindle part 11. If the steering torque exceeds the amount predetermined as permissive, then the second steering spindle part 13 rotates within the tolerance or fitting ring 15 whereby, however, the limit torque continues to be transmitted. The driver recognizes in this manner that upon further torque increase a damage of the steering gear, steering linkage, or the like might take place. In case of emergency, however, the excessive torque is transmitted by an entrainment pin 25 secured in the second steering spindle part 13 to the first steering spindle part 11 provided for that purpose with a slot 26.

In case of a frontal impact accident, the impact continues through the steering column into the passenger space and produces a reaction impact by the driver thrust against a protective end plate 27 of the steering wheel 19. This reaction impact is initially absorbed completely by the tolerance ring 15. Upon exceeding a predetermined impact force, still permissive for the human body, the second steering spindle part 13 begins to displace axially with respect to the tolerance or fitting ring 15 whereby the resistance force of the latter decreases to the same extent as it releases the collar 14 of the second steering spindle part 13. The deformation pot 18 thereby begins to absorb a shock component that continues to increase until— after complete release of the collar 14 by the tolerance or fitting ring 15—it reaches the full amount of the reaction impact. The deformation path available for that purpose corresponds to the distance of the needle bearing 22 or ball bearing 23 to the upper end of the steering spindle part 11.

In the diagram according to FIGURE 2, the curve of the resistance P is plotted against displacement along the deformation path S, more particularly, the curve 28 indicates the characteristics for the tolerance or fitting ring 15 and collar 14, the curve 29 the characteristics of the deformation pot 18 and the curve 30, the combination of the two characteristics 26 and 27. As the combined curve 30 indicates, by appropriate construction of the deformation pot 18 and by a suitable selection of the frictional resistance—achieved by a corresponding fitting of the tolerance or fitting ring 15—an approximately uniform dissipation of the reaction impact may be achieved along the deformation path S. This corresponds—presupposing a constant axial displacing velocity of the second steering spindle part 13—to an approximately uniform force P over the duration of the deformation. The advantage of the tolerance or fitting ring 15 therefore resides in its dual function: On the one hand, it acts as safety means against an excessive steering torque with simultaneous freedom from play in the direction of rotation while, on the other, it takes care of a shock damping in the steering column in case of frontal impact accidents. Additionally, the tolerance or fitting ring 15 is inexpensive in the standardized construction and may be readily exchanged in case of non-usability.

With the embodiment illustrated in FIGURE 3, in contrast to the embodiment according to FIGURE 1, the second steering spindle part 13a is constructed without collar 14 so that the resistance of the tolerance or fitting ring 15 remains constant along the displacing path. With this construction, the deformation pot 18 becomes unnecessary and can be dispensed with.

In the constructions according to FIGURES 4 and 5 and FIGURES 4a and 5a, the first steering spindle part 11b consisting of standardized square tubular stock is disposed within the tubular casing 10 whereby either the steering spindle part 11b may be supported at its lower cylindrically shaped expanded end 11b' in the casing 10 by means of roller bearings (not illustrated) or such a bearing support may be provided at the third steering spindle part 31. The third steering spindle part 31 is rigidly secured at the first steering part 11b, for example, by welding. A coupling member 34 or 34a provided with a right angle cross section is secured at the lower end of the second steering spindle part 13b which in contrast to the embodiment of FIGURE 1, is axially displaceably supported in the casing 10 by means of the roller bearings 32 or 33. The coupling element 34 or 34a is disposed within the first steering spindle part 11b whereby it is complemented by means of a second, similarly constructed coupling member 35 or 35a into a square-shaped member. Inclined surfaces 36 or 36a are provided as contact surfaces for the two coupling members 34 and 35 or of the two coupling members 34a and 35a. A compression coil spring 38 is arranged in a hollow space 37 or 37a constituted by the two coupling members 34, 35 or 34a, 35a. The square-shaped coupling assembly adapts itself accurately to the square inner contours of the first steering spindle part 11b by means of the compression coil spring 38 and the inclined surfaces 36 or 36a. As a result thereof, a transmission of the steering torque, free from play in the direction of rotation, from the second steering spindle part 13b to the first steering spindle part 11b may be realized. As shown in FIGURES 4 and 4a, the cam surfaces 36 and 36a will produce a radial expansion of the coupling members 34, 35 and 34a, 35a upon relative axial movement away from each other caused by the compression spring 38. The abutment pressure of the coupling members 34, 35 or 34a, 35a at the inner walls of the first steering spindle part 11b, achieved by the compression coil spring 38 and the inclined surfaces 36 or 36a, produces by reason of the friction between the corresponding parts the frictional resistance against axial displacement of the second steering spindle part 13b whereby as additional safeguard the shearing pin 39 is provided extending transversely through the coupling member 34 or 34a and the first steering spindle part 11b which shearing pin 39 is sheared off upon exceeding a predetermined axial force determined beforehand as permissive.

With the construction illustrated in FIGURES 6 and 7, the lower end of the second steering spindle part 13c is provided with a hexagonally shaped collar 40 into which is machined an annular groove 41. The first steering spindle part generally designated by reference numeral 11c is provided at the upper end with an expanded portion also of hexagonal shape. The inner diameter of the cylindrically shaped upper end of the first steering spindle part 11c corresponds to the length of a diagonal of the hexagonal collar 40 at the second steering spindle part 13c. The intermediate space between the hexagonal collar 40 and the inner contour of the hexagonally shaped expanded portion of the first steering spindle part 11c is filled with a layer 42 of conventional synthetic plastic material which, for example, may be molded or injected into the same, whereby the bulge or bead 43 forms within the annular groove 41. If an impact now occurs in the axial direction of the steering column, then upon exceeding of a permissive limit force the bulge 43 is sheared off, and an axial displacement of the second steering spindle part 13c with respect to the synthetic plastic layer 42 against the resistance thereof takes place. Also in this embodiment, the resistance decreases corresponding to the release of the hexagonal collar 40, i.e., the impact is absorbed to an increasing extent by the deformation pot 18. The synthetic plastic layer 42 is axially fixed by the collar 44 produced by the expanding of the first steering spindle part 11c. The steering torque is transmitted from the second steering spindle part 13c by way of the plastic layer 42 without play in the direction of rotation to the first steering spindle part 11c.

While I have shown and described one embodiment in accordance with the present invention, it is understood that the same is not limited thereto but is susceptible of numerous changes and modifications as known to a person skilled in the art, and I therefore do not wish to be limited to the details shown and described herein, but intend to cover all such changes and modifications as are encompassed by the scope of the appended claims.

I claim:

1. A safety steering column adapted to support a steering wheel of vehicles, especially motor vehicles, comprising tubular casing means, steering spindle means within said casing means subdivided into two parts adapted to be displaced telescopically with respect to each other but rotating in unison with one another, means for rotatably supporting a first one of said steering spindle parts in said casing means so as to be relatively fixed in the axial direction, the second steering spindle part being axially displaceable relative to said first part upon exceeding a predetermined force supporting the steering wheel, and further means for absorbing approximately uniformly an axial impact on the steering spindle means including means between said first and second steering spindle parts for the transmission of the steering torque substantially without play in the direction of rotation while simultaneously producing a mechanical frictional resistance during axial displacement therebetween.

2. The safety steering column according to claim 1, wherein said further means normally transmits all of the steering torque and includes force fit friction connecting means between said first and second steering spindle parts for producing only a friction torque connection for normal steering torque and only an axial friction resistance.

3. The safety steering column according to claim 1, wherein said further means includes force-locking connecting means between said first and second steering spindle parts which establishes a force-locking connection of said two parts both in the direction of rotation as well as in the longitudinal direction, said force-locking connecting means includes at least one tolerance ring means axially secured in a recess provided in one of said steering spindle parts and force-lockingly abutting against the other steering spindle part.

4. The safety steering column according to claim 3, further comprising entrainment pin means secured at said second steering spindle part for the transmission of a steering torque which is larger than the limit torque adapted to be transmitted by the tolerance ring means of said force-locking connecting means, said entrainment pin means engaging in a longitudinal slot provided in said first steering spindle part.

5. The safety steering column according to claim 1, wherein said further means includes force-locking connecting means between said first and second steering spindle parts which establishes a force-locking connection of said two parts both in the direction of rotation as well as in the longitudinal direction, entrainment pin means secured at said second steering spindle part for the transmission of a steering torque which is larger than the limit torque adapted to be transmitted by the force-locking connecting means, said entrainment pin means engaging in a longitudinal slot provided in said first steering spindle part.

6. The safety steering column according to claim 1, wherein said further means includes means between the first and second steering spindle parts which establish therebetween a force-locking connection in the direction of rotation upon exceeding the normal permissive steering torque.

7. The safety steering column according to claim 1, wherein said last-mentioned means includes two coupling members having a substantially right-angle cross section and forming, when combined, a quadrangle within the first steering spindle part also of similar quadrangular shape, said coupling members being provided with inclined mutual contact surfaces, one of said coupling members being rigidly secured at the second steering spindle part, and coil spring means supporting the other coupling member against the one coupling member, said spring means being arranged within a substantially cylindrical aperture formed by the to coupling members.

8. The safety steering column according to claim 1, wherein said last-mentioned means includes polygonal collar means at the second steering spindle part and a similar polygonal expanded portion in the first steering spindle part, plastic means between said collar means and said expanded portion, said plastic means being axially fixed by the collar resulting from the expanding of the first steering spindle part.

9. A safety steering column adapted to support a steering wheel of vehicles, especially motor vehicles, comprising tubular casing means, steering spindle means within said casing means subdivided into two parts adapted to be displaced telescopically with respect to each other but rotating in unison with one another, means for rotatably supporting a first one of said steering spindle parts in said casing means so as to be relatively fixed in the axial direction, the second steering spindle part being axially displaceable relative to said first part upon application of a predetermined force and supporting the steering wheel, and impact means for absorbing approximately uniformly an axial impact on the steering spindle including deformation pot means between the second steering spindle part and one of the two parts consisting of said first steering spindle part and of said casing means, and said impact means including further means between said first and second steering spindle parts for the transmission of the steering torque substantially without play in the direction of rotation while simultaneously producing a mechanical frictional resistance during axial displacement between said first and second steering spindle parts.

10. The safety steering column according to claim 9, further comprising disk-like means provided with bearing means for receiving therein the second steering spindle part, said deformation pot means being operatively connected, on the one hand, at said casing means and, on the other, below the steering wheel with said disk-like means.

11. The safety steering column according to claim 10, wherein said pot means is a substantially conical deformation pot facing with its larger diameter the steering wheel and consisting of several conical sections connected with each other in a step-like manner, said casing means as well as said disk-like means being supported on the last step-like sections, respectively.

12. The safety steering column according to claim 10, wherein said further means normally transmits all of the steering torque and includes force fit friction connecting means between said first and second steering spindle parts for producing only a friction torque connection for normal steering torque and only an axial friction resistance.

13. The safety steering column according to claim 10, wherein said further means includes force-locking connecting means between said first and second steering spindle parts which establishes a force-locking connection of said two parts both in the direction of rotation as well as in the longitudinal direction, said force-locking connecting means includes at least one tolerance ring means axially secured in a recess provided in one of said steering spindle parts and force-lockingly abutting against the other steering spindle part.

14. The safety steering column according to claim 13, further comprising entrainment pin means secured at said second steering spindle part for the transmission of a steering torque which is larger than the limit torque adapted to be transmitted by the tolerance ring means, said entrainment pin means engaging in a longitudinal slot provided in said first steering spindle part.

15. The safety steering column according to claim 9, wherein said further means normally transmits all of the steering torque and includes force fit friction, connecting means between said first and second steering spindle parts for producing only a friction torque connection for normal steering torque and only an axial friction resistance.

16. The safety steering column according to claim 15, wherein said force-locking connecting means includes at least one tolerance ring means axially secured in a recess provided in one of said steering spindle parts and force-lockingly abutting against the other steering spindle part.

17. The safety steering column according to claim 16, further comprising entrainment pin means secured at said second steering spindle part for the transmission of a steering torque which is larger than the limit torque adapted to be transmitted by the tolerance ring means, said entrainment pin means engaging in a longitudinal slot provided in said first steering spindle part.

18. The safety steering column according to claim 9, wherein said further means includes means between the first and second steering spindle parts which establish therebetween a force-locking connection in the direction of rotation upon exceeding the normal permissive steering torque.

19. The safety steering column according to claim 9, wherein said last-mentioned means includes two coupling members having a substantially right-angle cross section and forming, when combined, a quadrangle within the first steering spindle part also of similar quadrangular shape, said coupling members being provided with inclined mutual contact surfaces, one of said coupling members being rigidly secured at the second steering spindle part, and coil spring means supporting the other coupling member against the one coupling member, said spring means being arranged within a substantially cylindrical aperture formed by the two coupling members.

20. The safety steering column according to claim 9, wherein said last-mentioned means includes polygonal collar means at the second steering spindle part and a similar polygonal expanded portion in the first steering spindle part, a plastic layer between said collar means and said expanded portion which is axially fixed by the collar resulting from the expanding of the first steering spindle part.

21. A steering column, comprising: spindle means for transmitting the entire steering torque and being divided into a first steering spindle part and a second steering spindle part; means providing the sole torque transmitting connection between said spindle parts to transmit normal steering torque only by friction, to produce a lost motion relative rotation between said spindle parts when the steering torque exceeds the normal to warn the driver, and to thereafter provide a positive torque connection between said parts for steering torques exceeding the normal; said last mentioned means consisting essentially of frictionally force fittingly engaging concentric surfaces respectively on said spindle parts and a radially extending pin and slot connection between said spindle parts.

References Cited
UNITED STATES PATENTS 3,016,764   1/1962   Fredericks et al. _____ 74—552

FOREIGN PATENTS 846,561   8/1960   Great Britain.

MILTON KAUFMAN, *Primary Examiner.*